R. McKEE.
STARTING LEVER FOR EXPLOSIVE ENGINES.
APPLICATION FILED FEB. 15, 1910.

969,798.

Patented Sept. 13, 1910.

R. McKEE.
STARTING LEVER FOR EXPLOSIVE ENGINES.
APPLICATION FILED FEB. 15, 1910.

969,798. Patented Sept. 13, 1910.

WITNESSES

INVENTOR
Robert McKee
BY
ATTORNEY

UNITED STATES PATENT OFFICE.

ROBERT McKEE, OF PHILADELPHIA, PENNSYLVANIA.

STARTING-LEVER FOR EXPLOSIVE-ENGINES.

969,798.  Specification of Letters Patent.  Patented Sept. 13, 1910.

Application filed February 15, 1910. Serial No. 543,991.

*To all whom it may concern:*

Be it known that I, ROBERT MCKEE, a citizen of the United States, and resident of the city and county of Philadelphia and State of Pennsylvania, have invented an Improvement in Starting-Levers for Explosive-Engines, of which the following is a specification.

My invention has reference to starting levers for explosive engines, and consists of certain improvements which are fully set forth in the following specification and shown in the accompanying drawings which form a part thereof.

The object of my invention is to provide a form of starting lever mechanism which shall be adapted for starting engines of the explosive type to prevent injury from the back-kick in case of premature explosion and reversal of the direction of the crank shaft.

My invention in the particular form illustrated is more especially adapted for use in connection with automobile engines wherein the engine is located within a housing back of the cooler, and the crank is arranged upon the outside of the cooler and in the front of the automobile.

My invention consists of certain improvements in mechanical appliances for accomplishing the above purposes, and which improvements are fully described hereinafter and more particularly defined in the claims.

Figure 1:
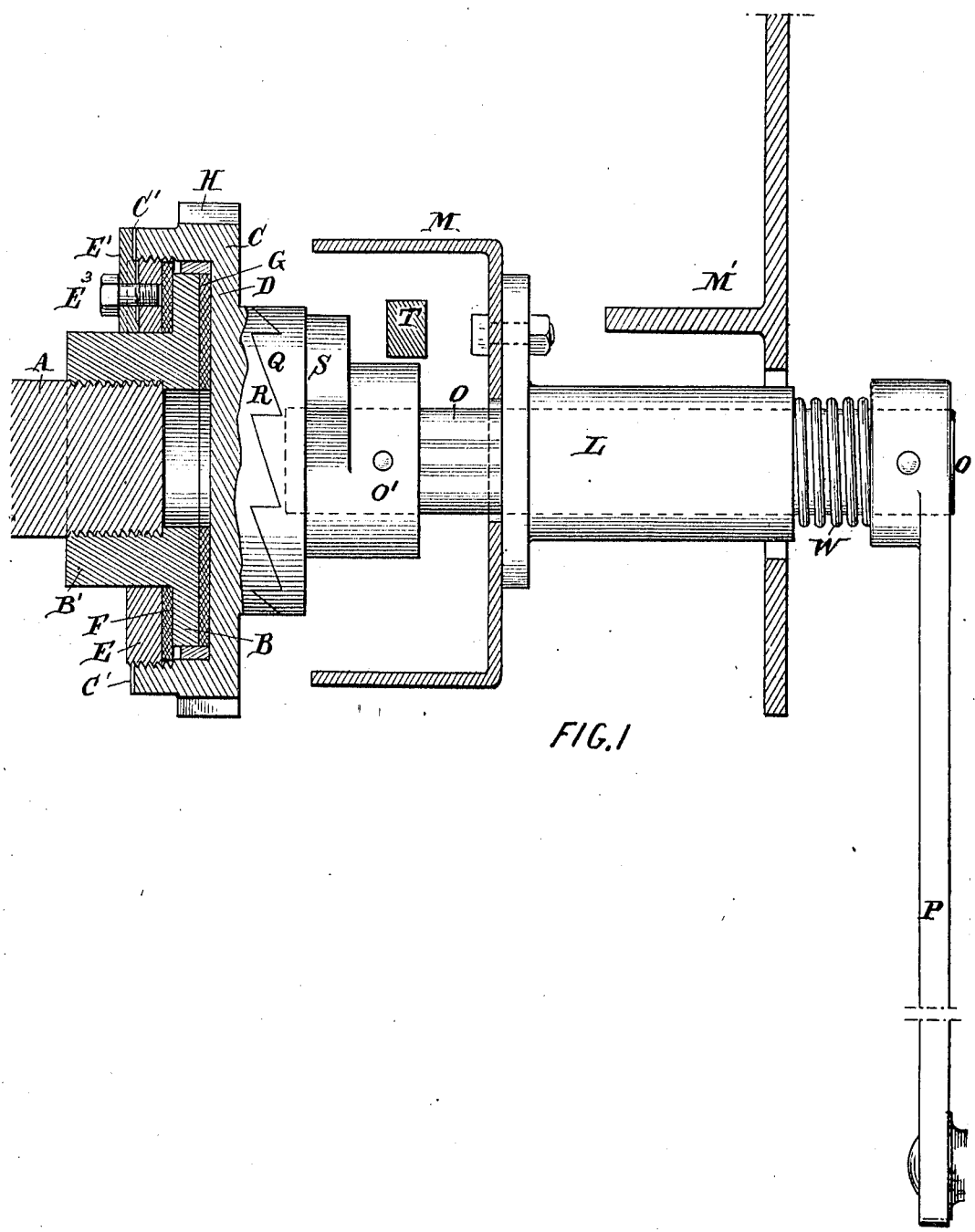
Figure 2:
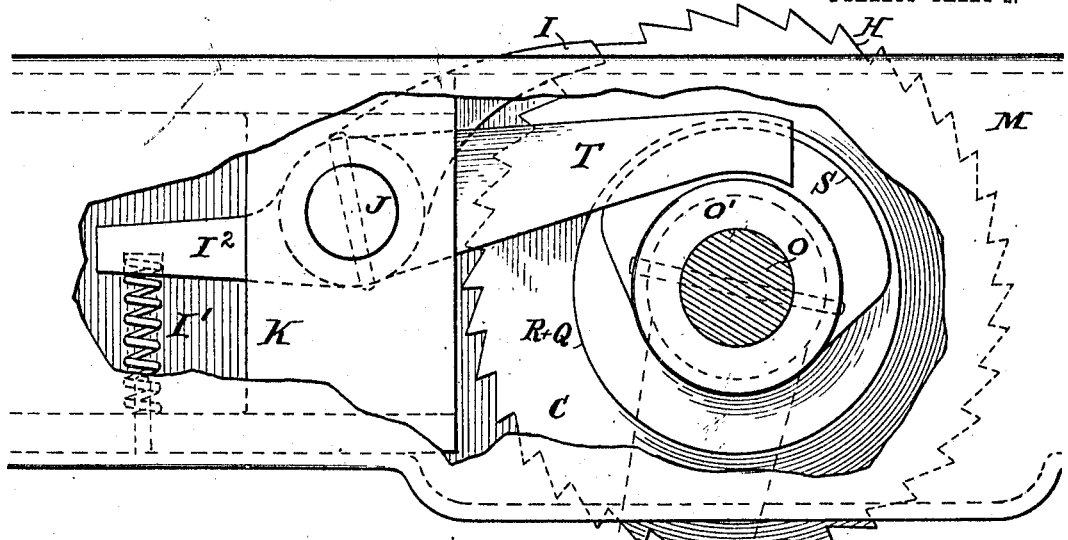
Figure 3:
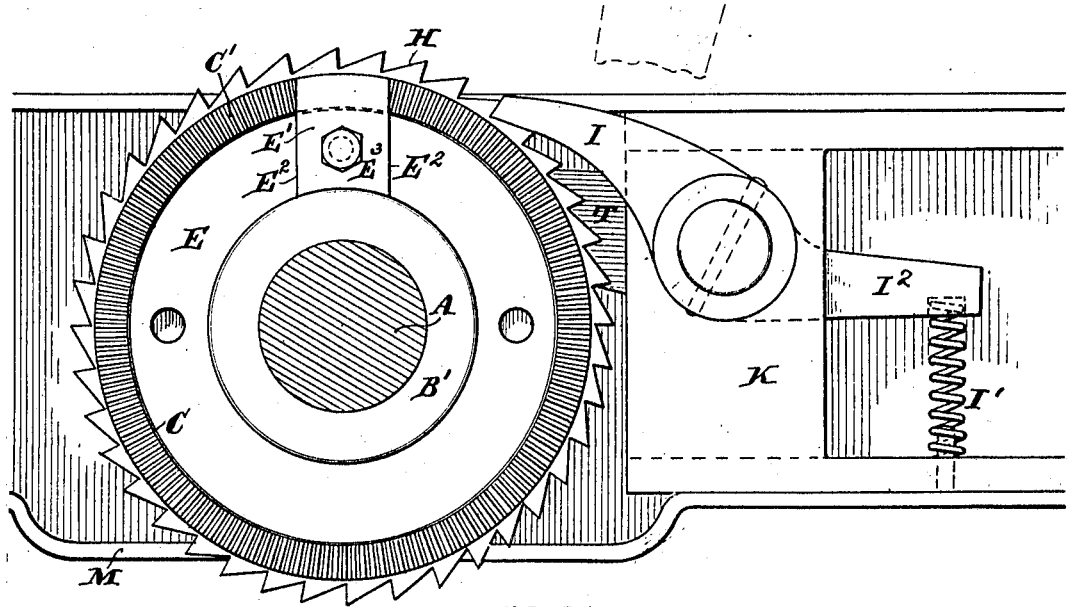

Referring to the drawings:—Figure 1 is a longitudinal sectional elevation of my improved starting lever mechanism; Fig. 2 is a sectional front elevation of the same; and Fig. 3 is a rear elevation of a portion of the same.

A is the crank shaft of the engine, and at its end is provided with an annular flange B which may be secured in place by a socket B' screwed or fastened to the end of the shaft.

C is a friction ring surrounding the flange part B and having a face D which is arranged in front of the end of the shaft and its annular flange, and interposed between this face D and the end of the flange of the shaft A is a friction washer G.

Arranged upon the opposite face of the flange B is an annular friction washer F and against this washer an annular bushing E presses, said bushing being screwed into the open end of the ring structure C. This bushing E may be adjusted by means of an ordinary spanner wrench and may provide any degree of clamping friction by the parts C, D, E, F and G constituting a friction driving device upon the annular flange B of the engine shaft. To lock the bushing E in its adjusted positions, I provide it with a block E' fitted in a radial groove E² and clamped in position by a screw E³. The outer part of this block engages fine teeth C' in the rim of the ring C to hold the bushing from being moved.

Extending in axial alinement with the end of the engine shaft A, is a tubular bearing L which projects from the main frame M and through the lower casing of the cooler M' to the front of the automobile. Journaled in this bearing L is a shaft O having capacity for rotation and longitudinal adjustment, and said shaft O acts as a hub and is provided with a hand crank P. The inner end of the shaft O is provided with a hub O' having an annular series of ratchet teeth Q which engage a corresponding annular series of ratchet teeth R which project from the front of the ring structure C. By means of these ratchet teeth Q and R the rotation of the crank P may be made to rotate the ring C and the remainder of the parts which constitute the friction driving devices for imparting rotation to the engine shaft A.

The ring C is provided on its circumference with ratchet teeth H with which a pawl I, pivoted at J to the frame K, engages, to prevent the ring C from being rotated backward, but which permits it to freely rotate with the crank P when manipulated. A spring I' normally presses the pawl into contact with the ratchet teeth. Secured to the pawl I is an arm T, and said arm extends over the hub O' of the crank shaft O, and said hub is provided with a cam S which approximates almost an arc of 180°, and so located with respect to the crank that, when the latter is down or when supported by the usual straps or other supporting devices common in automobiles, it will act upon the arm T to throw the pawl I against the action of the spring I' and out of engagement with the ratchet teeth H. Moreover, this action can only take place when the ratchet teeth Q and R are out of engagement and the shaft O has been shifted forward to bring the cam S under the arm T, and which is the normal position of the apparatus during the running of the engine. When this position of the parts is had, it will be seen that the ratchet teeth H on the ring C are being rotated with the engine without contacting with the pawl I, and consequently permitting the engine to run without the noise which would otherwise be created by the pawl engaging the ratchet teeth as they rapidly rotate under it.

When it is desired to start the engine from the condition of rest, the crank shaft O is turned so that the crank P comes above the shaft. This brings the cam S to the lowest position and out of contact with the arm T; the crank is then pushed inward toward the engine against the action of spring W until the ratchet teeth Q engage the ratchet teeth R. In this condition of the apparatus, the arm T is not affected by the rotation of the cam S and is held slightly above the hub O' of shaft O while permitting the pawl I to be spring pressed into engagement with the ratchet teeth H. A rotation of the crank, under the above adjustment, causes the ring C to be rotated, and at the same time the pawl I locks it against backward rotation; this also insures the crank against backward rotation in case of premature explosion and reversal of the direction of rotation of the shaft A. As soon as the engine shaft A begins to rotate in the right direction, namely the direction of the normal movement of the crank E, the ratchet teeth R, traveling faster than the ratchet teeth Q, push the crank shaft O with its cam S outward with the result that the lever T may be acted upon by the cam S and lifted, and this throws the pawl I out of engagement with the traveling ratchet teeth H. The spring W holds the crank shaft hub and its teeth Q out of engagement with the teeth R of the friction ring when the engine is running, and as it has no other function, it may be very light.

It is evident that while I have shown the annular flange B as made of a separate part from the crank shaft A and screwed thereon by the socket portion B' as a convenient mode of applying my device to automobiles already in use, the said parts A and B may be formed as an integral structure. It is also evident that, so far as the bearing of the shaft O is concerned, its particular mode of attachment is immaterial so long as the axis of said shaft is in axial alinement with the axis of the engine shaft A.

The apparatus disclosed is shown in a simple form of design in which all of the parts are in alinement and rotatable about the same axis, but it is evident that modifications of this design might be employed, and while they would be more complicated, the essential elements of the mechanism may be incorporated in said modified form of design without departing from the essential features of the invention, and I therefore do not restrict myself to this particular design above described the same being illustrated as an example and not as a restriction.

I have shown my invention in the form in which I have found it most excellently adapted for commercial use, but I do not restrict myself to the details thereof, as these may be modified in various ways without departing from the spirit of the invention.

Having now described my invention, what I claim as new and desire to secure by Letters Patent, is:—

1. In a device of the character described, the combination of the engine shaft having an annular flange rotatable therewith, friction driving devices clamping the annular flange for rotating it, means to prevent the friction driving devices from rotating in one direction but permitting it to freely rotate in the other direction, hand operated means rotatably supported and adapted to engage the friction driving devices for rotating them, in one direction only, and means controlled by the hand operated device in certain positions of adjustment for throwing out of operation the means for preventing the rotation of the friction driving devices.

2. In a device of the character described, the combination of the engine shaft having an annular flange rotatable therewith, friction driving devices clamping the annular flange for rotating it, means to prevent the friction driving devices from rotating in one direction but permitting it to freely rotate in the other direction, hand operated means rotatably supported and adapted to engage the friction driving devices for rotating them in one direction only, and means controlled by the hand operated device in certain positions of adjustment for throwing out of operation the means for preventing the rotation of the friction driving devices and also for locking the hand operated devices out of engagement with the friction driving devices when the engine shaft is being rotated in its normal direction.

3. In a device of the character described, the combination of the engine shaft, friction driving devices in connection therewith for rotating it when starting the engine, hand operated devices for rotating the friction driving devices and making a detachable engagement with said friction driving devices which become normally disengaged when the engine starts to rotate in its normal direction, retaining means to prevent rotation of the friction driving devices in a direction contrary to the normal rotation of the engine shaft, and devices to automatically throw and hold the said retaining means out of engagement with the friction driving devices when the hand operated devices are out of engagement with the friction driving devices.

4. In a device of the character described, the combination of the engine shaft, friction driving devices in connection therewith for rotating it when starting the engine, hand operated devices for rotating the friction driving devices and making a detachable engagement with said friction driving devices which become normally disengaged when the engine starts to rotate in its normal direction, retaining means to prevent rotation of the friction driving devices in a direction contrary to the normal rotation of the engine shaft, and devices controlled by the hand operated devices to automatically throw the said retaining means out of engagement with the friction driving devices when the engine shaft is rotating in its normal direction.

5. In a device of the character described, the combination of the engine shaft, friction driving devices in connection therewith for rotating it when starting the engine, hand operated devices for rotating the friction driving devices and making a detachable engagement with said friction driving devices which become normally disengaged when the engine starts to rotate in its normal direction, retaining means to prevent rotation of the friction driving devices in a direction contrary to the normal rotation of the engine shaft, and devices controlled by the hand operated devices when the hand operated part is brought to its inoperative position below a horizontal plane through the engine shaft to automatically throw the said retaining means out of engagement with the friction driving devices when the engine shaft is rotating in its normal direction.

6. In a device of the character described, the combination of the engine shaft, friction devices engaging the shaft by which to rotate it at starting said friction devices being provided with an annular series of ratchet teeth, a rotatable hand operated part for rotating the friction driving devices, a pawl engaging the ratchet teeth of the friction driving devices to prevent them rotating in a backward direction, and connecting means between the pawl and the hand operated device for throwing the pawl out of engagement with the ratchet teeth when the engine shaft is rotated in its normal direction.

7. In a device of the character described, the combination of the engine shaft, friction devices engaging the shaft by which to rotate it at starting said friction devices being provided with an annular series of ratchet teeth, a rotatable hand operated part for rotating the friction driving devices and adapted to be disengaged from the friction driving devices when normally rotating with the engine shaft, and also provided with a cam, a pawl engaging the ratchet teeth of the friction driving devices to prevent them rotating in a backward direction, and connecting means between the pawl and the hand operated device for throwing the pawl out of engagement with the ratchet teeth when the engine shaft is rotated in its normal direction.

8. In a device of the character described, the combination of the engine shaft having an annular flange secured to it, a ring surrounding the said annular flange and provided with devices for creating friction upon the said annular flange and also provided with ratchet teeth, a crank handle having a rotatable part axially journaled concentric with the engine shaft and having ratchet teeth to engage the ratchet teeth on the ring, a pawl to engage the ratchet teeth on the ring to prevent backward rotation thereof, and means for throwing the pawl out of engagement with the ratchet teeth consisting of an arm to oscillate the pawl and a cam on the rotatable part of the crank handle to oscillate the arm.

9. In a device of the character described, the combination of the engine shaft having an annular flange secured to it, a ring surrounding the said annular flange and provided with devices for creating friction upon the said annular flange and also provided with ratchet teeth, a crank handle having a rotatable part axially journaled concentric with the engine shaft and having ratchet teeth to engage the ratchet teeth on the ring, a pawl to engage the ratchet teeth on the ring to prevent backward rotation thereof, and means for throwing the pawl out of engagement with the ratchet teeth consisting of an arm to oscillate the pawl and a cam on the rotatable part of the crank handle to oscillate the arm when the crank handle is in a position below a horizontal plane through the engine shaft and out of engagement with the arm when the crank handle is above the horizontal plane through the engine shaft.

10. In a device of the character described, the combination of the engine shaft having an annular flange secured to it, a ring surrounding the said annular flange and provided with devices for creating friction upon the said annular flange and also provided with ratchet teeth, a crank handle having a rotatable part axially journaled concentric with the engine shaft and having ratchet teeth to engage the ratchet teeth on the ring, a pawl to engage the ratchet teeth on the ring to prevent backward rotation thereof, and means for throwing the pawl out of engagement with the ratchet teeth consisting of an arm to oscillate the pawl and a cam on the rotatable part of the crank handle to oscillate the arm when the handle crank its hub and ratchet teeth have been shifted longitudinally out of operative engagement with the ratchet teeth on the ring.

11. In a device of the character described, the combination of the crank shaft having an annular flange, a bearing extending axially beyond its end, a ring surrounding the annular flange having suitable friction devices for clamping the faces of the annular flange and also provided with ratchet teeth, a pawl engaging the ratchet teeth for preventing a backward rotation of the ring, a crank shaft journaled in the bearing so as to be rotatable and longitudinally adjustable therein and provided with ratchet teeth for engaging corresponding ratchet teeth upon the ring to rotate said ring in the normal direction of the rotation of the engaging shaft, and means for maintaining the pawl in or out of operative engagement with the ratchet teeth of the ring.

12. In a device of the character described, the combination of the crank shaft having an annular flange, a bearing extending axially beyond its end, a ring surrounding the annular flange having suitable friction devices for clamping the faces of the annular flange and also provided with ratchet teeth, a pawl engaging the ratchet teeth for preventing a backward rotation of the ring, a crank shaft journaled in the bearing so as to be rotatable and longitudinally adjustable therein and provided with ratchet teeth for engaging corresponding ratchet teeth upon the ring to rotate said ring in the normal direction of the rotation of the engaging shaft, and means connecting with the pawl for disengaging the pawl from the ratchet teeth of the ring when the ratchet teeth of the crank handle are out of engagement with the ratchet teeth of the ring.

13. In a device of the character described, the combination of the engine shaft having an annular flange, a bearing beyond the flange, a ring extending around the flange and having an inwardly directed annular face in opposition to one face on the annular flange, an adjustable bushing within the ring for creating a friction upon the other face of the annular flange, means to prevent the rotation of the ring in a backward direction, a shaft journaled in the bearing and having a crank handle at one end and provided at the other end with engaging means for rotating the ring and its bushing in the normal direction of rotation of the engine shaft and said shaft having capacity for longitudinal adjustment for permitting a normal continuous disengagement from the ring.

14. In a device of the character described, the combination of the engine shaft having an annular flange, a flanged ring extending around the annular flange of the engine shaft and creating a friction against one face thereof, an annular bushing screwed into the open end of the flanged ring and creating a friction upon the other face of the annular flange of the engine shaft, a locking device carried by the bushing and engaging the flanged ring to hold the bushing against movement relatively to the flanged ring, hand operated means to rotate the flanged ring and its bushing in one direction, and means to lock the flanged ring against rotation in the other direction.

15. In a device of the character described, the combination of the engine shaft having an annular flange, a flanged ring extending around the annular flange of the engine shaft and creating a friction against one face thereof and having an annular rim provided with fine teeth, an annular bushing screwed into the open end of the flanged ring and creating a friction upon the other face of the annular flange of the engine shaft, a locking device carried by the bushing having teeth to engage the teeth on the flanged ring to hold the bushing against movement relatively to the flanged ring, a clamping screw for clamping the locking device to the bushing and in engagement with the flanged ring, hand operated means to rotate the flanged ring and its bushing in one direction, and means to lock the flanged ring against rotation in the other direction.

In testimony of which invention, I hereunto set my hand.

ROBERT McKEE

Witnesses:
R. M. HUNTER,
R. M. KELLY.